(12) United States Patent
Mazzini et al.

(10) Patent No.: US 10,439,726 B1
(45) Date of Patent: Oct. 8, 2019

(54) BI-DIRECTIONAL TEMPERATURE CONTROLLED OPTICAL TRANSCEIVER

(71) Applicant: Cisco Technology, Inc., San Jose, CA (US)

(72) Inventors: Marco Mazzini, Sevilla (IT); Alberto Cervasio, Cuorgne' (IT); Tao Ling, Breinigsville, PA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/177,737

(22) Filed: Nov. 1, 2018

(51) Int. Cl.
| | |
|---|---|
| *H04B 10/572* | (2013.01) |
| *H04B 10/40* | (2013.01) |
| *H04B 10/25* | (2013.01) |
| *G02B 6/42* | (2006.01) |
| *H04B 10/079* | (2013.01) |

(52) U.S. Cl.
CPC .......... *H04B 10/40* (2013.01); *G02B 6/4246* (2013.01); *H04B 10/0799* (2013.01); *H04B 10/2503* (2013.01); *H04B 10/2504* (2013.01)

(58) Field of Classification Search
CPC ................................................. H04B 10/572
See application file for complete search history.

(56) References Cited

U.S. PATENT DOCUMENTS

| | | | |
|---|---|---|---|
| 5,469,288 | A | 11/1995 | Onaka et al. |
| 6,473,224 | B2 | 10/2002 | Dugan et al. |
| 7,444,055 | B2 | 10/2008 | Tolstikhin et al. |
| 8,538,260 | B2 | 9/2013 | Niven-Jenkins et al. |
| 8,774,632 | B2 | 7/2014 | Archambault |
| 9,136,968 | B2 | 9/2015 | Lee et al. |
| 9,225,422 | B1 | 12/2015 | Nagarajan |

(Continued)

FOREIGN PATENT DOCUMENTS

KR 100918390 B1 9/2009

OTHER PUBLICATIONS

A. Nespola et al., "Bidirectional PAM-4 Experimental Proof-of-Concept to Double Capacity per Fiber in 2-km Data Center Links", ECOC 2017, Sep. 2017, http://www.ismb.it/en/node/4000, 3 pages.

(Continued)

*Primary Examiner* — Shi K Li
(74) *Attorney, Agent, or Firm* — Edell, Shapiro & Finnan, LLC

(57) ABSTRACT

A local node of an optical network obtains local operating parameters associated with a bi-directional link to a remote node of the optical network, including a nominal local wavelength and a local temperature. The local node also obtains remote operating parameters of the remote node, including a nominal remote wavelength and a remote temperature. The local node further determines a target local wavelength based on a comparison of the local operating parameters and the remote operating parameters, and tunes a local transmitter to generate light at the target local wavelength. The local node also tunes a local filter to transmit light at the target local wavelength and reflect light at a target remote wavelength. This may be done by exchanging a configuration identifier with the remote node. The configuration identifier from the remote node is encoded in pulses of light from a remote transmitter in the remote node.

20 Claims, 8 Drawing Sheets

(56) References Cited

U.S. PATENT DOCUMENTS

| | | | |
|---|---|---|---|
| 9,780,908 B2 | 10/2017 | Vetter et al. | |
| 2003/0058496 A1 | 3/2003 | Obeda et al. | |
| 2011/0052207 A1* | 3/2011 | Ishikawa | H01S 5/0687 |
| | | | 398/182 |
| 2016/0381442 A1 | 12/2016 | Heanue et al. | |
| 2017/0279554 A1* | 9/2017 | Lin | H04B 10/2503 |

OTHER PUBLICATIONS

Dario Pilori et al., "Bidirectional 4-PAM to Double Per-Fiber Capacity in 2-km Intra-Datacenter Links", vol. 10, No. 2, Apr. 2018, 11 pages.

Cisco, "Cisco 40GBASE QSFP Modules", C78-660083-21, Sep. 2017, 14 pages.

* cited by examiner

BI-DIRECTIONAL TEMPERATURE CONTROLLED OPTICAL TRANSCEIVER

TECHNICAL FIELD

The present disclosure relates to high-bandwidth optical networking.

BACKGROUND

The Institute of Electrical and Electronics Engineers (IEEE) has incorporated a modulation format for pulse amplitude modulation (PAM4) into optical networking standards (e.g., 802.3bs for 400 Gb/s, and 802.3cd for 200/50 Gb/s) to address continuously rising bandwidth capacity. Adoption of PAM4 modulation increases the single lane bandwidth by a factor of two. However, further increasing the bandwidth and/or squeezing the form factor has resulted in a bottleneck.

Ribbon solutions (e.g., 400GBASE-DR4, 100G-PSM4, 100GBASE-SR4) may be defined and used for high bandwidth connections, especially for intra-data center (e.g., up to 2 km). However, duplex solutions remain viable for both inter-data-center and intra-data-center connections, on both single mode fiber (SMF) and multi-mode fiber (MMF). IEEE solutions to maintain duplex interfaces tends to assume the adoption of multiple wavelength in Coarse Wavelength Division Multiplexing (CWDM) or Local Area Network (LAN) Wavelength Division Multiplexing (LWDM) grids.

DESCRIPTION OF EXAMPLE EMBODIMENTS

Overview

Figure 1:
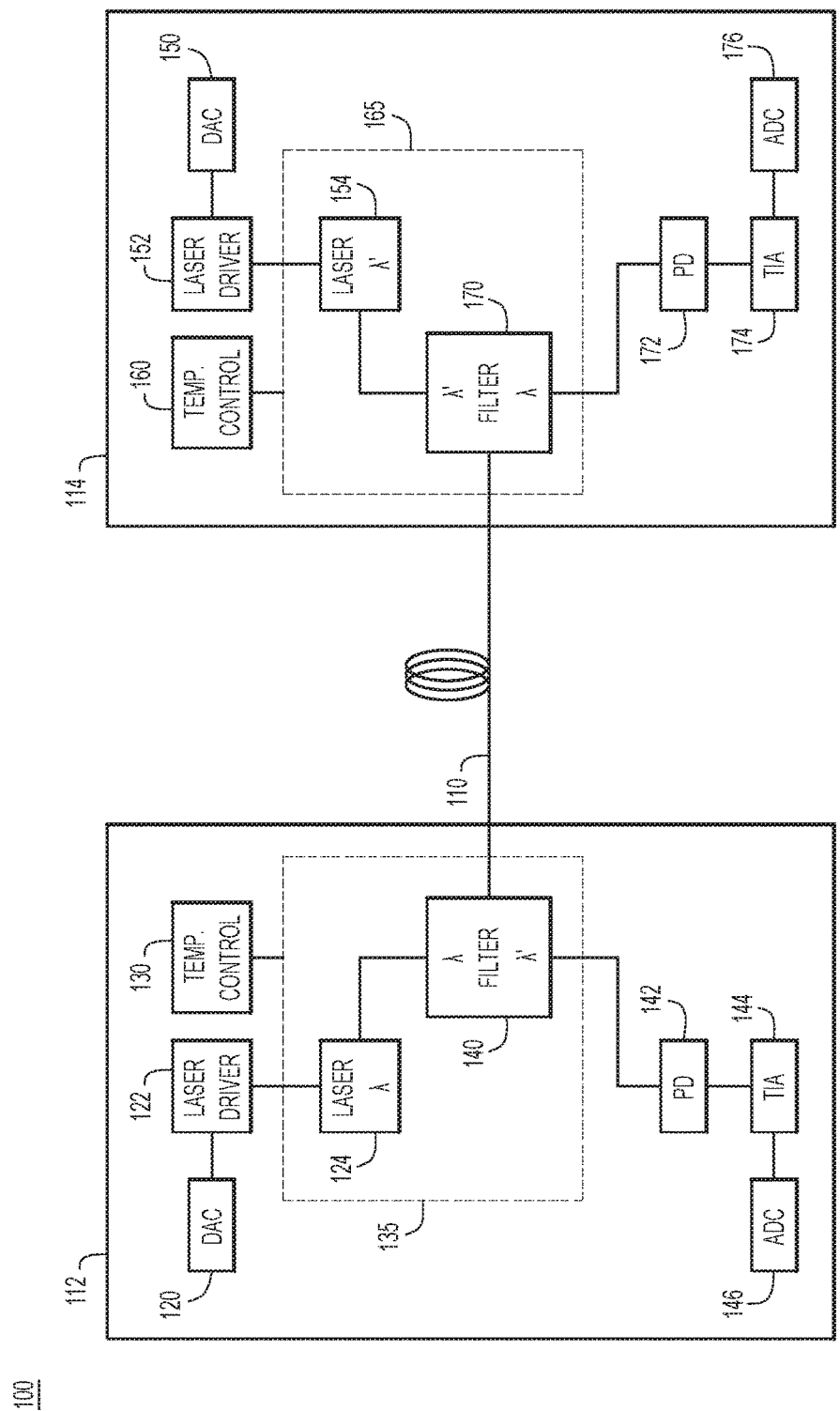
FIG. 1 is a simplified block diagram of a bidirectional segment of an optical network, according to an example embodiment.

Presented herein are techniques enabling a local node of an optical network to configure a bi-directional optical link with a remote node. The local node obtains local operating parameters associated with the bi-directional link, including a nominal local wavelength and a local temperature. The local node also obtains remote operating parameters of the remote node, including a nominal remote wavelength and a remote temperature. The local node further determines a target local wavelength based on a comparison of the local operating parameters and the remote operating parameters, and tunes a local transmitter to generate light at the target local wavelength. The local node also tunes a local filter to transmit light at the target local wavelength and reflect light at a target remote wavelength.

DETAILED DESCRIPTION

A typical form factor for 400G modules is the Quad Small Form-factor Pluggable (QFSP) Double Density (QFSP-DD) transceiver. One option for doubling the bandwidth (e.g., from 400G to 800G) would be to drive each of the electrical lanes at 100G. However, doubling the bandwidth to 800G may raise issues with re-using the same fibers and components inside the module, while maintaining reasonable real estate.

Another option for doubling the bandwidth is to use the same wavelength over two orthogonal polarization. However, enabling polarization tracking will typically consume significant additional resources at the receiver, particularly when implemented in silicon photonics (SiP). For instance, for a single side and a single lambda with dual polarization, the net insertion loss will typically range from 1.5-3 dB and the power consumption will range from 50-200 mW. Additionally, the total number of SiP components to track the dual polarization include 5-7 stages of thermal tuning for each polarization. Further, tracking the dual polarization requires continuous control at two sense points and each of the 5-7 control points, updating with a frequency greater than 100 kHz. The total footprint of this type of connector capable of tracking dual polarization would typically approach 100 μm×4 mm.

In contrast, the techniques described herein enable a simpler, smaller, and more efficient bi-directional transceiver with a single lambda. The bi-directional transceiver described herein has a net insertion loss of less than 1 dB and a power consumption under 25 mW. Additionally, the bidirectional transceiver described herein includes a single sense point and a single control point, and does not require continuous control. Further, with only three SiP components (e.g., a Bragg filter, mode multiplexer, and thermal tuner), the footprint of the bidirectional transceiver described herein may be reduced to 50 μm×500 μm.

Additionally, these options are for doubling the bandwidth of a single lane from 100G to 200G. For an 800G structure, the difference in footprint and number of SiP components would be four times greater for the dual polarization solution in contrast to an 800G structure according to the techniques presented herein. By maintaining the 100G data rate granularity, the transceiver described herein reduces the number of components, reduces the module power consumption, re-uses the same kind of fiber, and reduces the number of fibers (or doubles the bit-rate for duplex fiber). The bi-directional transceiver based on SiP described herein allows integration into a QSFP28 interface, as well as enabling an 800G module in a QSFP-DD form factor.

Referring now to FIG. 1, a simplified block diagram of a system 100 comprising a bi-directional, optical lane on a single fiber 110 between a local transceiver 112 and a remote transceiver 114. The local transceiver 112 includes a Digital to Analog Converter (DAC) 120 that converts digital signals for transmission into analog signals to drive the laser driver 122. The laser driver 122 provides an input signal to modulate the transmission laser 124. The local transceiver 112 also includes a temperature controller 130 to adjust the temperature in a physical zone 135. Adjusting the temperature of the zone 135 adjusts the local wavelength $\lambda$ that is generated by the laser 124. A wavelength filter 140 separates the local wavelength $\lambda$ from the remote wavelength $\lambda'$. The filter 140 is also within the temperature controlled zone 135 so that the target wavelength of the filter 140 may be adjusted along with the wavelength of the transmission laser 124.

The filter 140 directs the light received at the remote wavelength $\lambda'$ to a photodiode (PD) 142 to generate a current proportional to the light intensity received at the remote wavelength $\lambda'$. The current signal is amplified by a transimpedance amplifier (TIA) 144 before being processed by an Analog to Digital Converter (ADC) 146.

The remote transceiver 114 includes components analogous to the local transceiver 112, including a DAC 150, laser driver 152, transmission laser 154, temperature controller 160, temperature controlled zone 165, filter 170, photodiode 172, transimpedance amplifier 174, and ADC 176. In this example, the only difference between the local transceiver 112 and the remote transceiver 114 is the nominal wavelengths $\lambda/\lambda'$ of the respective transmission lasers and filters. Hereinafter, the components of the local transceiver 112 will be explicitly referenced, but analogous features may apply to components in the remote transceiver 114.

In one example, the temperature controller 130 adjusts the temperature of the laser 124 and the filter 140 within the zone 135 according to a voltage/current applied to the temperature controller 130. For instance, the temperature controller 130 may include a heater to raise the temperature within the zone 135 and/or a thermoelectric cooler (TEC) to lower the temperature within the zone 135.

In another example, the filter 140 is operable to minimize the power of the remote transmission laser 154 from hitting the local transmission laser 124 at wavelengths that are controlled by the temperature controller 130. Typically, bi-directional solutions use optical isolators in front of both transmission lasers, but isolators for SiP applications are typically large and expensive. Alternatively, a typical bi-directional solution may avoid isolators in front of the transmission laser 124 by filtering on the remote transceiver 114. However, if the filters that discriminate between the local wavelength $\lambda$ and the remote wavelength $\lambda'$ are fixed, then two separate Product Identifiers (PIDs) would be required (e.g., a PID for the local transceiver 112 and a separate PID for the remote transceiver 114).

The filter 140 provides enough spectral separation (e.g., greater than twice the baud rate) between the two lasers (i.e., laser 124 and laser 154) to allow bi-directional communication when individual reflection points generate reflections smaller than R=−20 dB. For a 53 Gbaud (i.e., sufficient for a 100G bi-directional block), the wavelengths of the lasers should be separated by at least 106 GHz or 0.6 nm. In one example, the system 100 is designed to separate the wavelengths $\lambda$ and $\lambda'$ by approximately 2 nm to ensure that the filtering roll-off behavior of the filter 140 is sufficient to meet the return loss tolerance of the laser 124.

As a further example, the remote node discovery process can be defined to comply with a Multi-Source Agreement (MSA) to ensure interoperability among optical network elements. Alternatively, custom interfaces may define operational wavelengths for local and remote transceivers that are not covered by any MSA (e.g., 2$\lambda$ PAM4 bi-directional MMF/SMF at 26 Gbaud). Regardless of any conventions used to define the wavelength grid and mode of operations, each end of the optical link may benefit from a clear determination of the physical wavelength allocated to each optical lane that the remote node discovery will also allow.

This would, in principle, enable the optical network elements to avoid confusion between different Physical-Media-Dependent (PMD) interfaces since these can be designed and/or configured to be compliant to different standards of MSA (e.g., a module configured according to the 400-FR4 MSA, while also supporting 200GBASE-FR4), as well as supporting different working modes at the same rate (e.g., 4×100G), or a custom mode. In this example, the local transceiver 112 may perform a remote node parameter discovery process to determine the optical parameters (e.g., transmission wavelength $\lambda'$) of the remote transceiver 114.

One example of the remote node parameter discovery process includes storing any potential remote node information in a local storage (e.g., a computer readable storage medium such as an Electrically Erasable Programmable Read Only Memory (EEPROM)). The potential remote node information may be stored in the local storage as a table or database with entries for remote node information (e.g., wavelength, lane mapping, temperature, etc.) associated with a configuration identifier. The configuration identifier may be associated with a particular type of data (e.g., wavelength) and a particular format of data (e.g., a 16-bit unsigned integer with units of 0.01 nm). The transmission wavelength of a laser (e.g., laser 124 or laser 154) is typically tested in a manufacturing environment at three temperatures: a high temperature (e.g., 70° C.), an ambient temperature (e.g., 40° C.), and a low temperature (e.g., 0° C.). The wavelength behavior of the laser may be interpolated for other values of temperature.

In another example, the remote transceiver 114 may transmit remote node information to the local transceiver 112 in an asynchronous serial binary data transmission protocol. The transmitted signal may comprise a series of discrete pulses based on the presence or absence of light (i.e., the local transceiver will detect a No Loss of Signal or Loss of Signal) to represent bit values of 1 or 0, respectively. Both the local transceiver 112 and the remote transceiver 114 may be programmed with the same protocol to guarantee completion of the data exchange.

This type of serial transmission will typically use a lower baud rate that is not comparable with the expected data rate using the complete optical networking protocol (e.g., with the TIA 144 and any Digital Signal Processing (DSP) following the ADC 146). For instance, the signal frequency may range between 1 kHz and 10 kHz, and will be selected to avoid any constraints on the module boot time. The minimum optical capabilities to run the protocol described herein include the capability to switch the laser (e.g., laser 124) on/off for data transmission, and the capability to detect input light/no light conditions (e.g., with the PD 142) for data reception. These minimal requirements for implementing the protocol for this initial communication of remote node information do not require significant processing resources from the local transceiver 112, the remote transceiver 114, or any network element implementing the transceivers.

Figure 2:
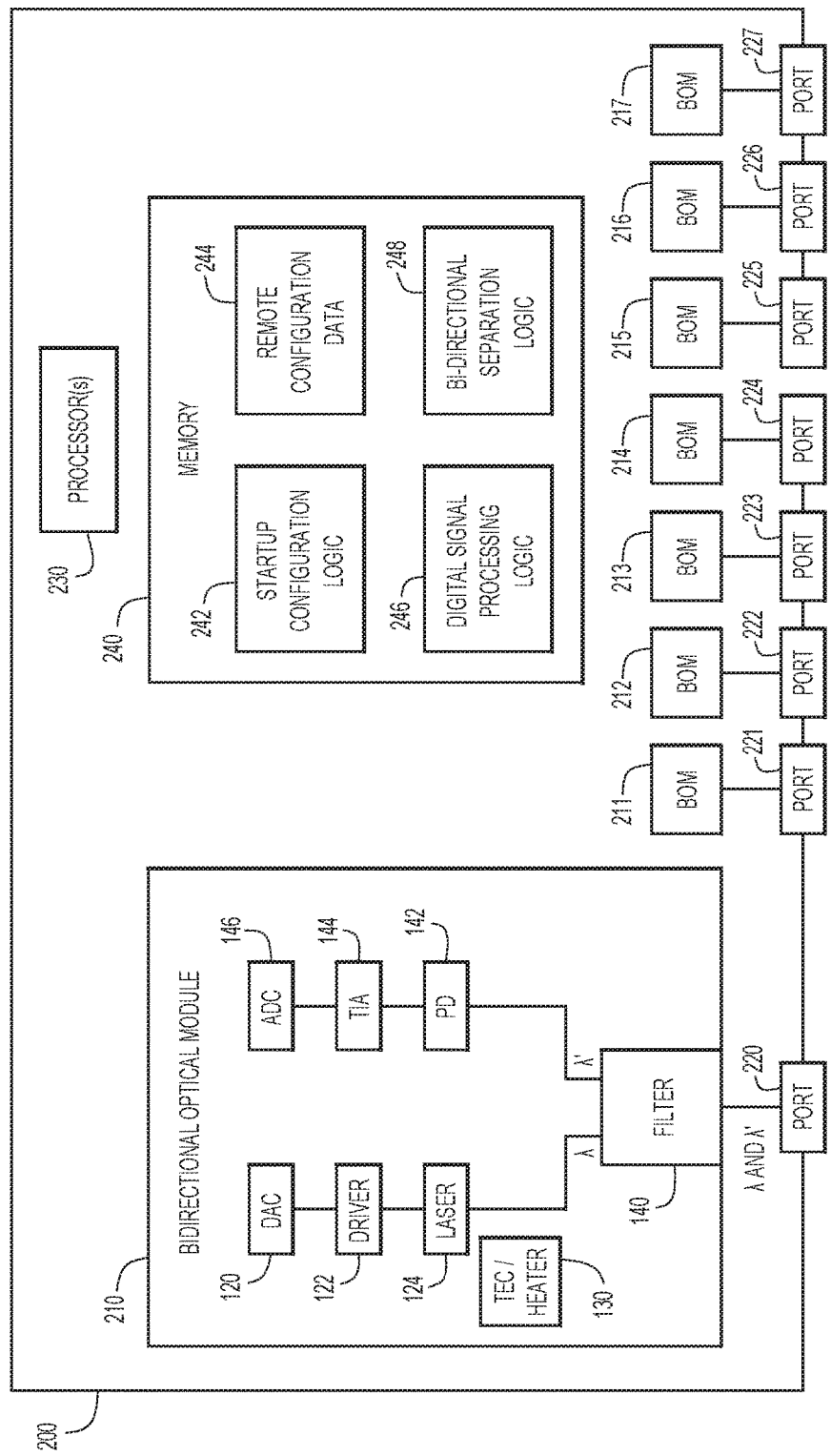
FIG. 2 is a simplified block diagram of an optical network element, according to an example embodiment.

Referring now to FIG. 2, a simplified block diagram illustrates a network element 200 incorporating multiple bidirectional optical modules (BOMs) to provide additional bandwidth. The network element 200 includes eight BOMs 210, 211, 212, 213, 214, 215, 216, and 217. For simplicity, only components of BOM 210, which are analogous to the components of the transceiver 112 shown in FIG. 1, are shown in FIG. 2. The components of BOM 210 include a DAC 120, a laser driver 122, a transmission laser 124, a temperature controller 130, a filter 140, a photodiode 142, a transimpedance amplifier 144, and an ADC 146.

The network element 200 includes ports 220, 221, 222, 223, 224, 225, 226, and 227 coupled to BOMs 210, 211, 212, 213, 214, 215, 216, and 217, respectively. The network element 200 also includes one or more processors 230 (e.g., microprocessors or microcontrollers) and a memory 240. The memory 240 stores startup configuration logic 242, remote configuration data 244, digital signal processing logic 246, and bi-directional separation logic 248. The startup configuration logic 242 may include instructions for an initial communication protocol to exchange optical parameters (e.g., nominal wavelength) with a remote network element. The remote configuration data 244 may be the optical parameters received in the initial exchange with the remote network element. The digital signal processing logic 246 may include instructions to process signals received from one or more of the BOMs (e.g., via ADC 146 of the BOM 210). The bidirectional separation logic 248 may include instructions to sufficiently separate the local transmission wavelength from the remote transmission wavelength to enable bi-directional communication over single fibers.

The memory 240 may include read only memory (ROM), random access memory (RAM), magnetic disk storage media devices, optical storage media devices, flash memory devices, electrical, optical, or other physical/tangible memory storage devices. Thus, in general, the memory 240 may comprise one or more tangible (non-transitory) computer readable storage media (e.g., a memory device) encoded with software comprising computer executable instructions and when the software is executed (by the one or more processors 230) it is operable to perform the operations described herein.

Figure 3A:
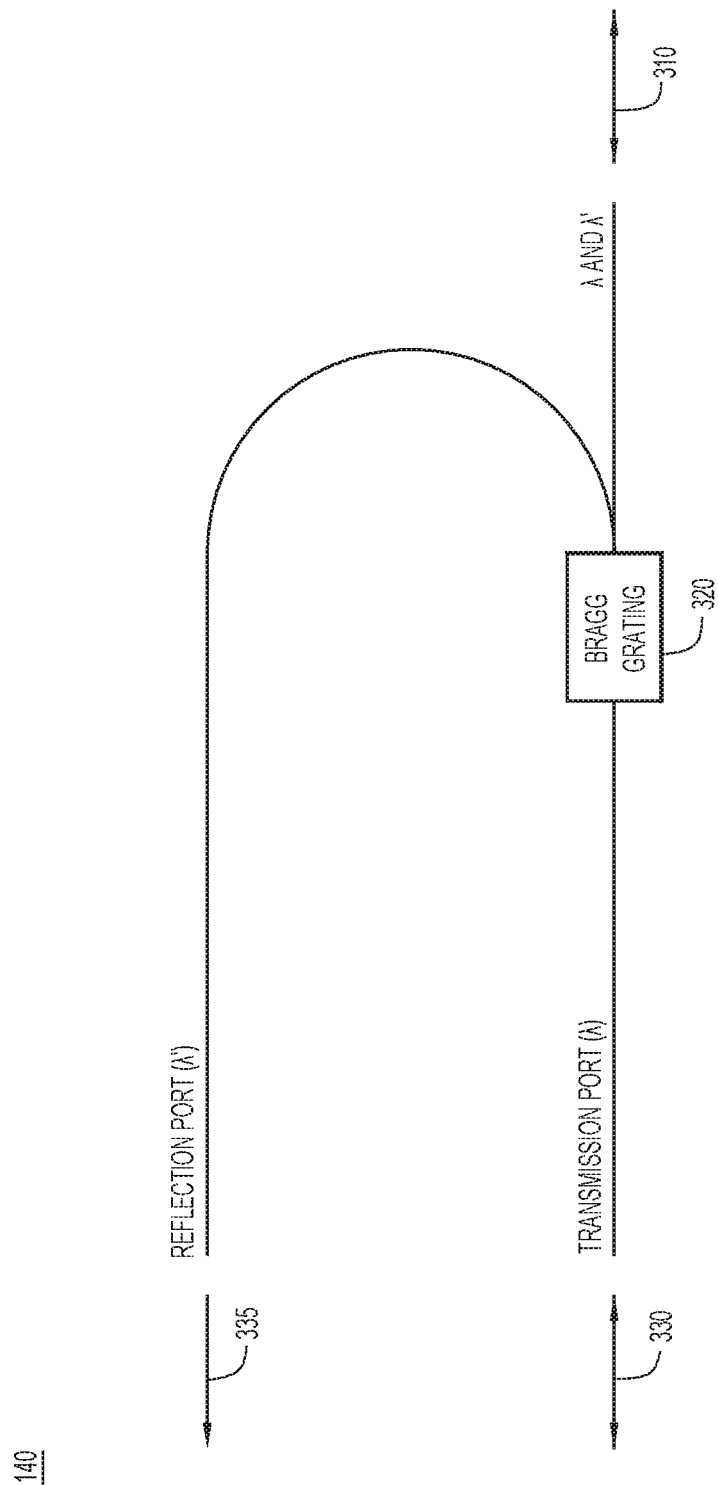
FIG. 3A is a simplified diagram of a wavelength filter for an optical network element, according to an example embodiment.

Referring now to FIG. 3A, a simplified diagram of one example of the filter 140 is shown. In this example, an optical signal 310 carries information bi-directionally on two wavelengths λ and λ'. The optical signal 310 enters the filter 140 at a Bragg grating 320 that is tuned to transmit light at one wavelength λ, and reflect light at another wavelength λ'. The transmitted light 330 is directed to a transmission port, and the reflected light 335 is directed to a reflection port. In one example, the Bragg grating 320 may be a silicon photonics component formed from silicon (e.g., via lithographic techniques).

Figure 3B:
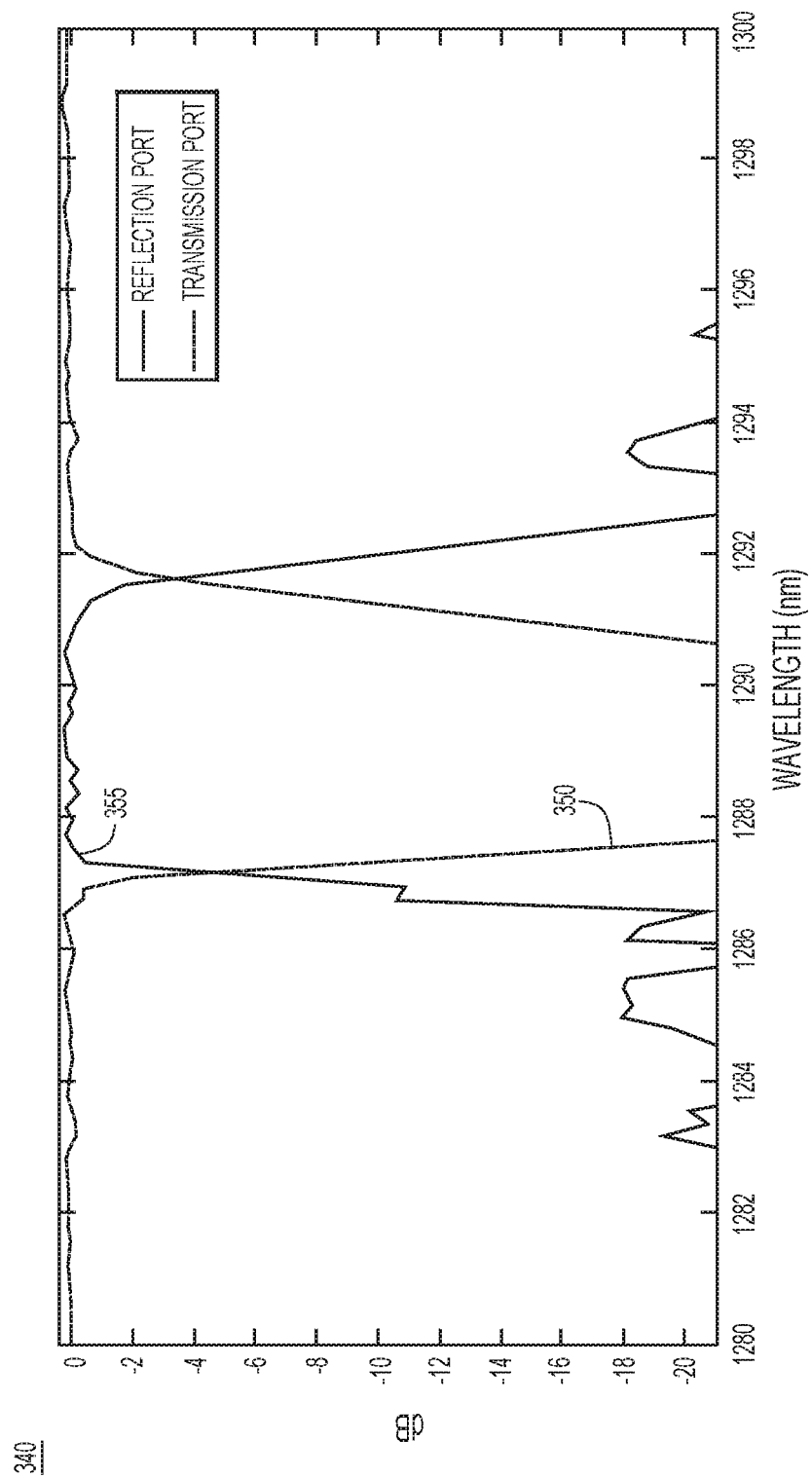
FIG. 3B is a graph of the attenuation of a wavelength filter for an optical network element, according to an example embodiment.

Referring now to FIG. 3B, a graph 340 illustrates an example of the optical attenuation of a Bragg grating 320. The line 350 of the graph 340 shows that light entering the Bragg grating is passed through the Bragg grating to the transmission port with essentially no attenuation except for across a narrow band of wavelengths (approximately 1288-1290 nm) in which the light is attenuated strongly (e.g., greater than −20 dB). The line 355 of the graph 340 shows that light entering the Bragg grating is reflected into the reflection port with essentially no attenuation across the same narrow band of wavelengths, and essentially no light is reflected into the reflection port outside of that narrow band of wavelengths.

In one example, the range of wavelengths of light reflected by the Bragg grating 320 the filter 140 may be tuned by adjusting the temperature of the Bragg grating 320. For instance, the temperature controller 130 (as shown in FIG. 1 and FIG. 2) may adjust the temperature of the Bragg grating 320 to place the nominal transmission wavelength λ' of the remote transceiver within the narrow band of wavelengths reflected by the Bragg grating 320, while the nominal transmission wavelength λ of the local transceiver is outside of the narrow band of reflected wavelengths. Additionally, the temperature of the Bragg grating 320 may be adjusted in tandem with the temperature of the transmission laser 124 through the same temperature controller 130.

Figure 4:
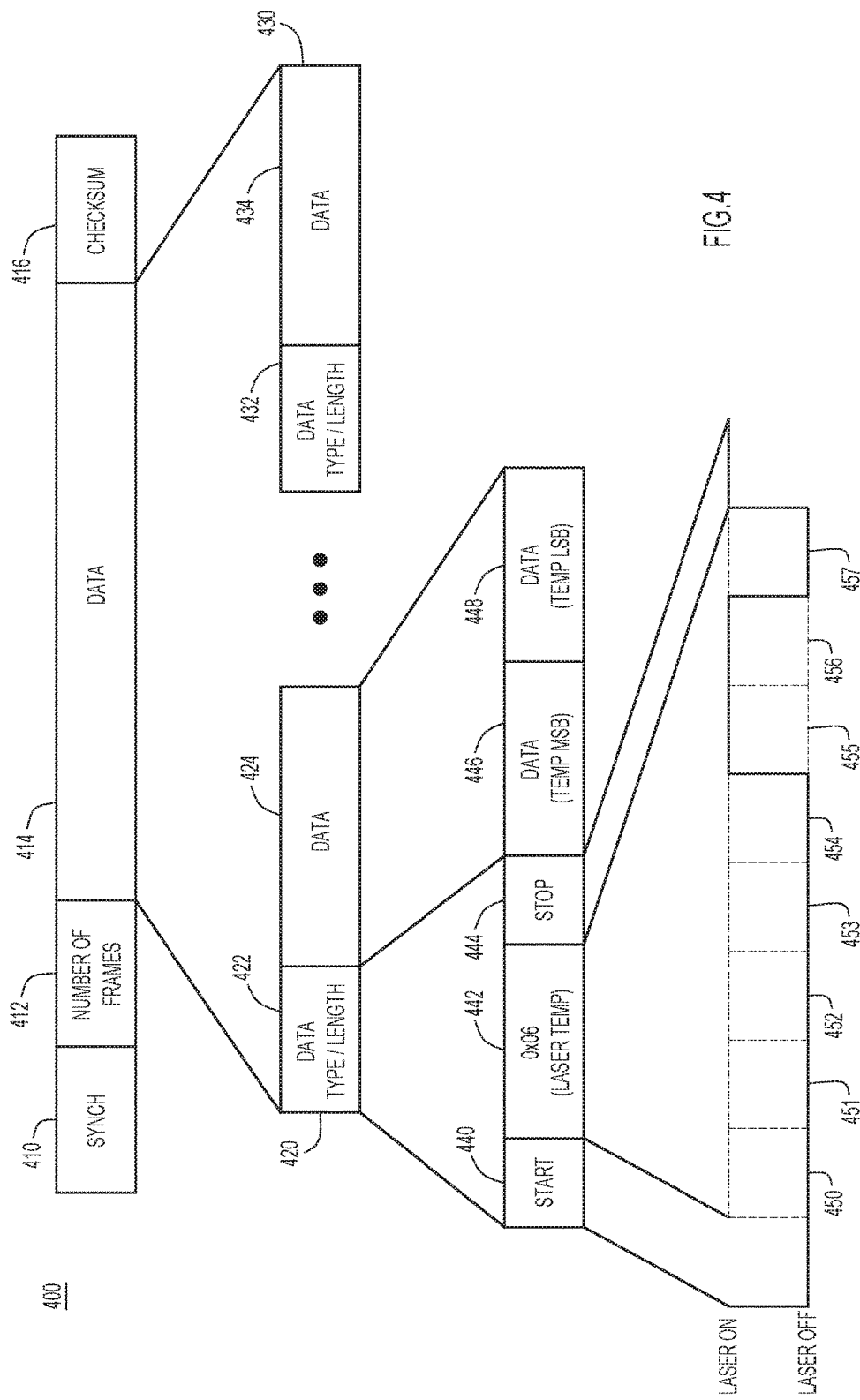
FIG. 4 is a simplified diagram of a frame structure used to communicate nominal wavelengths between optical network elements at startup, according to an example embodiment.

Referring now to FIG. 4, a diagram illustrates a data packet 400 that is used to communicate remote node information (e.g., nominal wavelengths) between optical network elements at startup. The data packet 400 includes a synchronization frame 410, a frame 412 indicating the number of data frames, the data frame(s) 414, and a checksum frame 416. In one example, the synchronization frame 410 holds a predetermined value (e.g., 0xAA), the frame 412 indicates a specific number N of data frames in the data packet 400, and the checksum frame 416 provides a standardized value to verify the accurate transmission of the entire data packet 400.

The remote node information is carried in the data frames 414, which includes data frames 420 and 430. The data frame 420 includes a data type/length value 422 and data value 424. The data frame 430 includes a data type/length value 432 and a data value 434. Though only two data frames 420 and 430 are shown in FIG. 4, additional data frames may be included as long as the total transmission time does not negatively impact the boot time of the transceiver.

The data type/length value 422 of data frame 420 includes a start bit 440, an 8-bit identifier 442 that is associated with a particular type of data (e.g., laser temperature associated with value 0x06), and a stop bit 444. The data value 424 includes the data bits 446 and 448, e.g., to encode the most significant bits of the laser temperature and the least significant bits of the laser temperature, respectively.

The basic frame structure of the data packet 400, as exemplified in the data type/length value 422 includes the start bit 440, data bits 450-457, and the stop bit 444. The logical state (i.e., 1 or 0) is determined by whether the local transceiver 112 detects the laser 154 of the remote transceiver 114 to be on or off. The start bit 440 is predetermined to be a transition from the presence of light (i.e., logical state 1) to the absence of light (i.e., logical state 0) and marks the beginning of the data type/length value 422, and the stop bit 444 is predetermined to transition back to the presence of light (i.e., logical state 1). The data bits 450-457 depicted as solid lines in FIG. 4 encode the identifier for the type/length of the data as a binary 00000110 (i.e., hexadecimal 0x06), with the dashed lines representing alternative representations for other values of the identifier. While only the specific bit format of data type/length value 422 with data 424 is shown in FIG. 4, other data frames (e.g., type/length 432 and data 434) may follow the same basic frame structure with start/stop bits surrounding data bits. The start/stop bits may be used to synchronize the remote transceiver with the local transceiver.

In one example, the local network element may store a table or database associating various values of data type/length as configuration identifiers or codewords for remote transceiver information. For instance, Table 1 provides one example of a table stored by each optical network element to enable a remote network element to communicate the status of the remote network element.

TABLE 1

Remote node information type/length

| Identifier Value (hex ID) | Number of data frames | Description | Format/Unit |
|---|---|---|---|
| 0x01 | 4 | Supported wavelengths of the transmitter | 4 bytes |
| 0x02 | 1 | Lane mapping host-line, each lane | 8-bit integer, 7:4, 3:0 |
| 0x03 | 1 | Lane mapping line-host, each lane | 8-bit integer, 7:4, 3:0 |
| 0x04 | 2 | Laser frequency | 16-bit unsigned integer, 0.01 GHz units |
| 0x05 | 2 | Module/chip temperature | 16-bit signed integer, 1/256° C. units |
| 0x06 | 2 | Laser temperature | 16-bit signed integer, 1/256° C. units |
| 0x07 | 1 | Dithering tone/frequency | 8-bit integer |
| 0x08 | 2 | Residual dispersion | 16-bit signed integer, 0.1 ps/nm units |
| 0x09 | 2 | Laser current | 16-bit unsigned integer, 0.1 mA units |
| 0x0A | 2 | TEC current | 16-bit unsigned integer, 0.1 mA units |
| 0x0B | 2 | PAM4 level TX transition parameter | 16-bit unsigned integer, 1/256 dB units |
| 0x0C | 2 | Laser output power | 16-bit unsigned integer, 0.1 µW units |
| 0x0D | 2 | Received power | 16-bit unsigned integer, 0.1 µW units |
| 0x0E | 1 | Transmitter emphasis | |
| 0x0F | 4 | Internally measured supply DSP voltage (4 voltages) | 8-bit unsigned integer, 0.05 mV units |
| 0x11-0xFF | | Reserved for future/other use | |

In another example, the remote node information may be transmitted at a relatively low data rate (e.g., 10 kHz) in comparison to the data rate ultimately established over the optical link between the local node and the remote node. At a 10 kHz data rate, the remote node can transmit all of the data fields listed in Table 1 in less time (e.g., less than 50 milliseconds) than the overall startup time of the entire optical module (e.g., several seconds).

Figure 5:
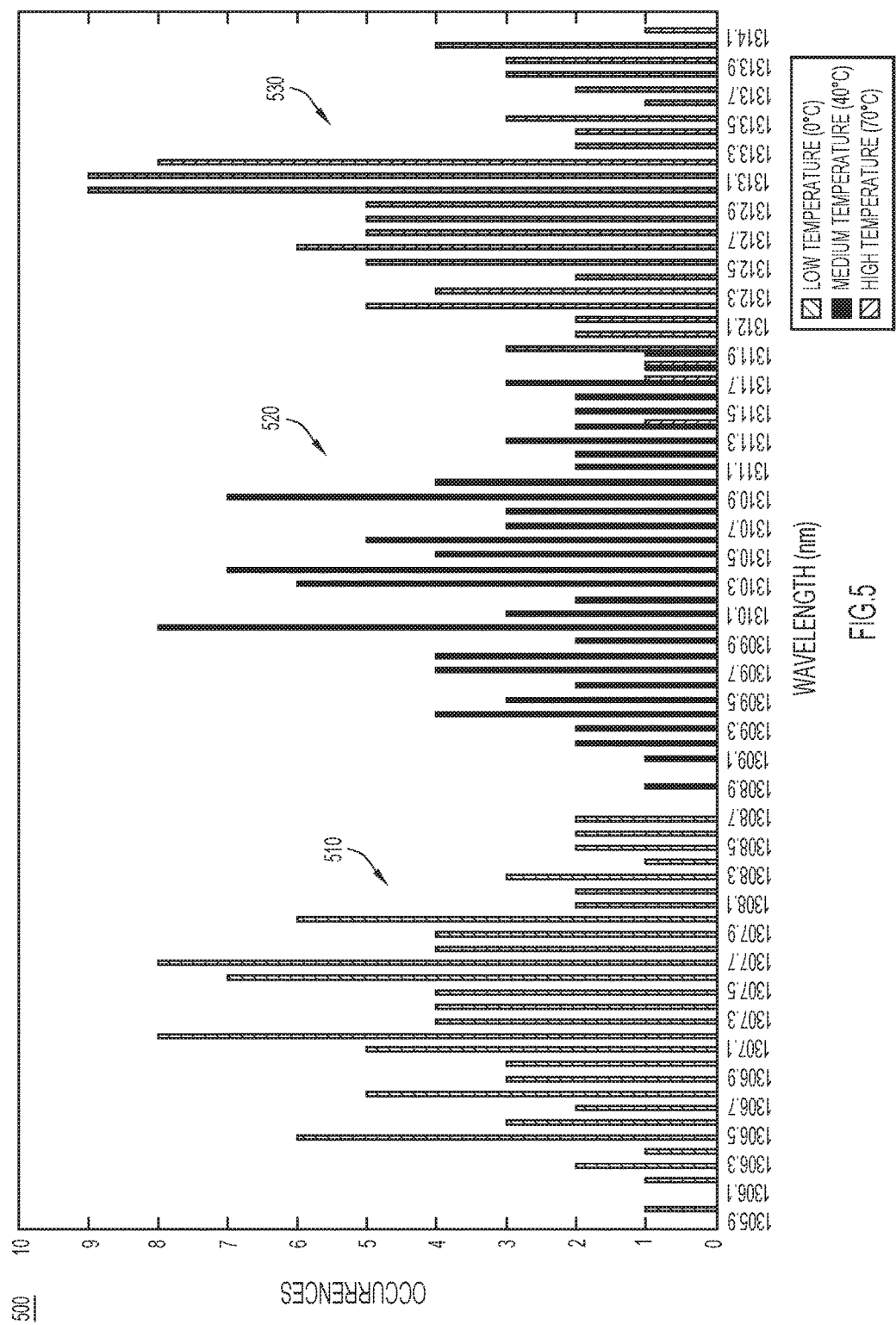
FIG. 5 is a graph illustrating the temperature dependence of the wavelength of light emitted from lasers, according to an example embodiment.

Referring now to FIG. 5, a graph 500 illustrates the transmission wavelengths of one hundred transmission lasers measured at three different temperature values. Variability in the manufacturing process of the transmission lasers leads to some variation in the wavelength of each of the lasers. Measuring the actual wavelength of one hundred lasers allows for statistical variation to be determined. Each data set 510, 520, and 530 enumerates how many lasers are measured to have each specific wavelength. Data set 510 represents the wavelength measurements at a low temperature (e.g., 0° C.). Data set 520 represents wavelength measurements recorded at a medium temperature (e.g., 40° C.). Data set 530 represents wavelength measurements at a high temperature (e.g., 70° C.). The spread of wavelengths between the data sets 510, 520, and 530 illustrate that the transmission lasers may be tuned across approximately 6 nm by adjusting the temperature of the laser from 0° C. to 70° C., which is well within the capability of typical TEC/heater temperature control modules.

Figure 6:
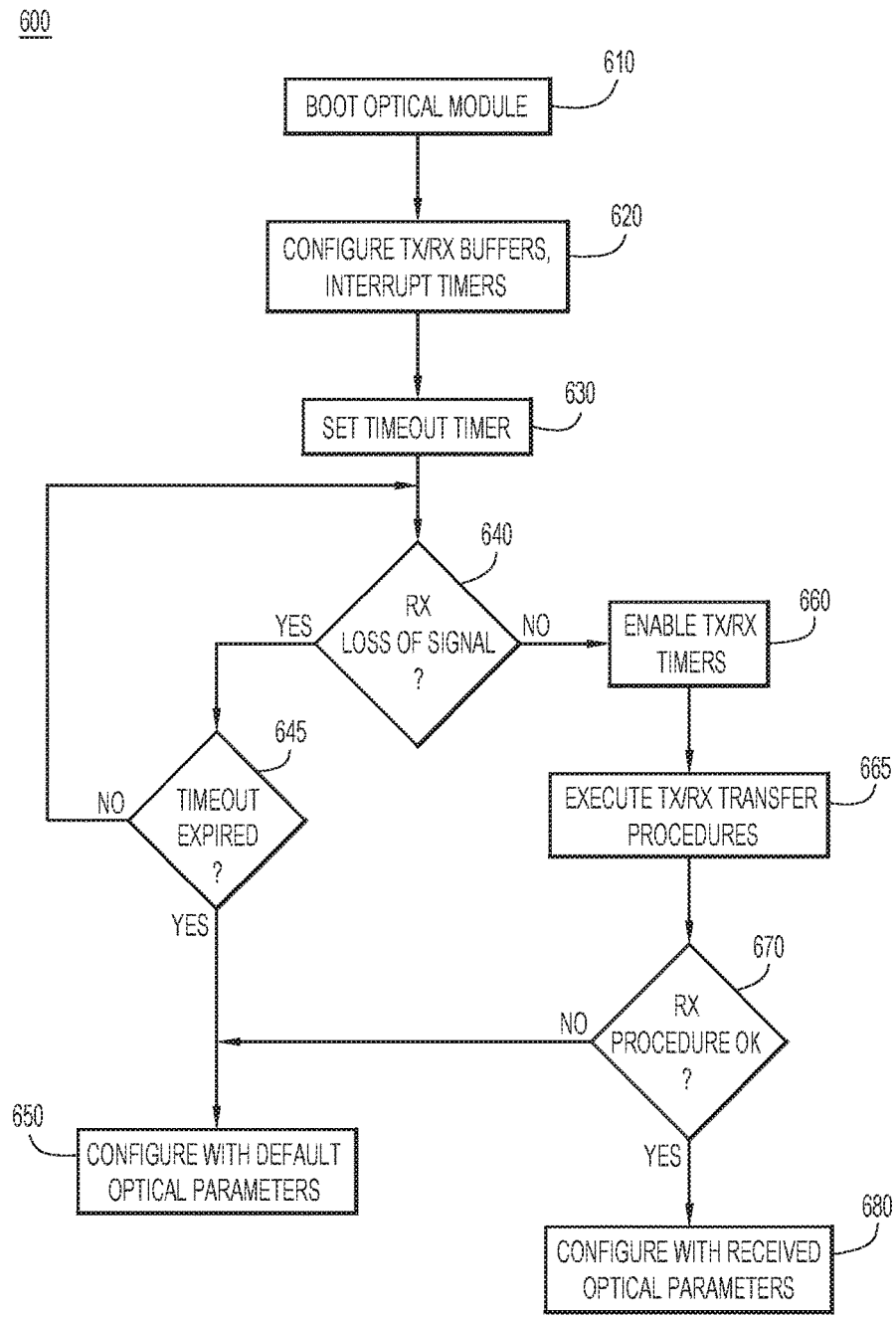
FIG. 6 is a flowchart of a method for initializing an optical network segment and communicating optical parameters from a transmitter to a receiver, according to an example embodiment.

Referring now to FIG. 6, a flowchart illustrates a process 600 performed by an optical network element (e.g., network element 200) to discover the optical parameters of a remote node during the provisioning of an optical module (e.g., bi-directional optical module 210). In step 610, the network element boots an optical module. The network element configures the transmitter buffer (TX) and receiver buffer (RX) and the interrupt timers for each buffer in step 620. In step 630, the sets a timeout timer and begins to look for light coming from the remote node. If the optical module detects Loss of Signal, i.e., there is no light coming from the remote node, as determined at step 640, then the network element checks to see if the timeout timer has expired at step 645. If the timeout timer expires before the optical module detects any light, then the network element proceeds to boot the optical module in step 650, and configures the optical module with default optical parameters.

If the optical modules detects a No Loss of Signal, i.e., there is light coming from the remote node, as determined in step 640, then the network element enables the TX/RX timers in step 660. The network element executes the remote node parameter transfer procedure in step 665 to receive the optical parameters of the remote node. In one example, executing the remote node parameter transfer procedure comprises receiving data frames with the optical parameters, as described with respect to FIG. 4. If the network element accurately receives the optical parameters of the remote node, as determined in step 670, then the network element configures the optical module according to the received optical parameters. If the optical parameters are not properly received (e.g., they are lost in transmission), then the network element configures the optical module with default parameters in step 650. In one example, the transmitted data is acknowledged within a predetermined amount of time by the transmission of an acknowledgement (ACK) frame.

In another example, the data exchange protocol illustrated in FIG. 6 is triggered by the first transition from a logical state 0 to logical state 1 (i.e., Loss of Signal to No Loss of Signal, or dark to light) detected at the receiver side. When this condition is detected, the optical module may start sending the optical parameters (e.g., wavelength) to the remote peer. Alternatively, the data exchange protocol may be enabled by the local module, and may occur after the initial boot of the optical module or as triggered by a host.

In a further example, the data exchange may fail to completely successfully, e.g., transmitted data is not acknowledged or the received data is corrupted. If the data exchange fails, the network element may retry the transmission and declare the link down until the successful completion of the data exchange. This scenario may be appropriate for network elements in which proper configuration of optical peer parameters is essential for link functionality. Alternatively, the network element may retry the data exchange for a fixed number of times, including zero (i.e., no retry attempts), before completing the bootstrap of the optical module with default parameters. This alternative scenario may be appropriate for network elements that can improve link performance with specific peer settings, but default settings can still provide a lower level of link connectivity. In cases where the data exchange of optical parameters does not complete successfully, a host connected to the network element may be signaled using appropriate alarms and/or warning flags, enabling the host to trigger the data exchange process at a later time.

Figure 7:
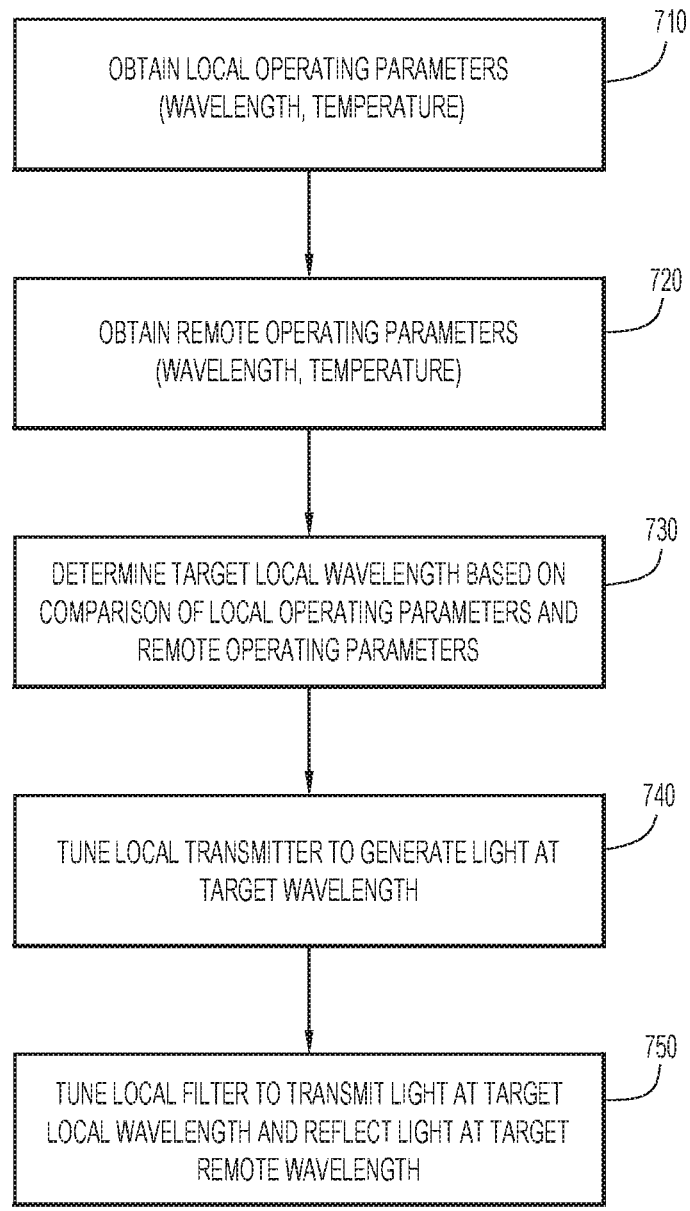
FIG. 7 is a flowchart of a method for tuning a local transmitter and filter to transmit/reflect light at wavelengths assigned to local/remote network elements, according to an example embodiment.

Referring now to FIG. 7, a flowchart illustrates a process 700 performed by a local node in an optical network (e.g., network element 200 in FIG. 2) to separate the wavelengths of the transmitted data and the received data. In step 710, the local node obtains local operating parameters associated with a bi-directional link with a remote transceiver. The local operating parameters include a nominal local wavelength and a local temperature. In one example, the local parameters may be measured or read from computer readable storage media. In step 720, the local node obtains remote operating parameters of the remote node, including a nominal remote wavelength and a remote temperature. In one example, the local node obtains the remote operating parameters by receiving a configuration identifier encoded in pulses of light from a remote transmitter (e.g., the remote transmission laser) of the remote node. The local node may look up the configuration identifier in a local storage to determine the remote operating parameters.

In step 730, the local node determines a target local wavelength based on a comparison of the local operating parameters and the remote operating parameters. In one example, the local node determines the target wavelength to be at least 2 nm away from a target remote wavelength. In step 740, the local node tunes a local transmitter to generate light at the target local wavelength. In one example, the local node tunes the local transmitter by adjusting the temperature of the transmitter. In step 750, the local node tunes a local filter to transmit light at the target local wavelength and reflect light at a target remote wavelength. In one example, the local filter is a Bragg grating that reflects light at the target remote wavelength into a photoreceptor (e.g., a photodiode) and transmits light at the target local wavelength from a transmission laser.

In another example, the local node compares the remote wavelength $\lambda'$ with the local wavelength $\lambda$ to determine the separation between the wavelengths without any tuning. If the remote wavelength $\lambda'$ and the local wavelength $\lambda$ are already separated by at least 2 nm, then the temperature controller may tune a SiP filter to transmit light at a wavelength $\lambda$ and reflect light at a wavelength $\lambda'$ without any adjustment of the transmission laser wavelength $\lambda$. The temperature controller on the remote node may similarly tune a SiP filter to transmit light at a wavelength $\lambda'$ and reflect light at a wavelength $\lambda$. In this instance, the target local wavelength is the original local wavelength $\lambda$, and the temperature controller does not need to adjust the temperature of the transmission laser.

If the remote wavelength $\lambda'$ is higher/lower than the local wavelength $\lambda$ by less than 2 nm, then both the local node and the remote node may calculate a target local wavelength $\lambda_{target}$ and a target remote wavelength $\lambda'_{target}$ to separate the wavelengths of the bi-directional link. If the remote wavelength $\lambda'$ is higher than the local wavelength $\lambda$, then the local laser may be cooled while the remote laser is heated until the wavelengths are separated by at least 2 nm. Conversely, if the remote wavelength $\lambda'$ is lower than the local wavelength $\lambda$, then the local laser may be heated while the remote laser is cooled. Alternatively, only one of the local node or remote node may adjust the temperature of the laser depending on other parameters. For instance, if either the local temperature or the remote temperature is already near one extreme of the operable temperature range, the wavelength separation may be achieved solely by adjusting the temperature of the other node.

In another instance, the local node and the remote node each adjust the temperature of their respective lasers by an approximately equal amount, e.g., to minimize the amount of power used by the temperature controllers. In this instance, each node may calculate the minimum additional separation $\Delta=2-|\lambda'-\lambda|$ needed to separate the wavelengths $\lambda$ and $\lambda'$ by 2 nm and heat/cool its transmission laser by $\Delta/2$. For instance, if the local node with a nominal wavelength $\lambda$ is measured at a higher temperature, then the local node will heat its transmission laser to set the target wavelength $\lambda_{target}=\lambda+\Delta/2$, while the remote node will cool its transmission laser to set the target wavelength $\lambda'_{target}=\lambda-\Delta/2$. In this instance, the most tuning of the wavelengths will occur when the initial wavelengths $\lambda$ and $\lambda'$ are close together, such that each laser will be tuned by a maximum of 1 nm. With a typical tuning coefficient of 0.065 nm/° C. (as can be calculated from the data shown in FIG. 5), tuning each laser by 1 nm corresponds to adjusting the temperature of each laser by a maximum of 15° C.

If the initial wavelengths $\lambda$ and $\lambda'$ are the same, then the local node and remote node may determine which laser will be cooled and which will be heated according to a predetermined process. For instance, if the temperature of the local node and the remote node are different, then the higher temperature node will cool its transmission laser, while the lower temperature node will heat its transmission laser. If the temperature of the two nodes are also identical, another parameter (e.g., the serial number of the node) may be used to quasi-randomly determine which node will cool its laser and which node will heat its laser. For instance, the node with a higher serial number may be predetermined to increase the laser temperature to achieve the wavelength separation, while the node with the lower serial number is predetermined to lower the temperature of its laser.

While the specific values used to determine the tuning of the lasers are used as an example, other values may be used based on circumstances, such as additional statistics on minimum laser separation (i.e., other than 2 nm) or temperature behavior (i.e., other than 0.065 nm/° C.). Additionally, the symmetrical tuning of the lasers assumes that both lasers are in similar environmental conditions, such that the temperature of the local node and remote node do not differ by such an amount that would be impossible for the temperature control units to tune and track. However, a finer (and/or iterative) process may be used, which depends on actual and/or expected temperature conditions of the network nodes. Further, in the case of a shared-laser structure (e.g., one transmission laser splits into two separate paths), all of the optical lanes with the shared laser will be associated with each other, enabling the same process to determine the target wavelength of the transmission laser.

In summary, the techniques presented herein describe a bi-directional, semi-cooled transceiver based on SiP technology that enable the re-use of existing 400GBASE-DR infrastructure targeting 800G development in a QSFP-DD form factor. The techniques described herein only require a single product identifier (PID), while using complementary filtering inside the optical module. Additionally, the techniques described herein leverage a remote node discovery process for transceivers to retrieve the optical parameters (e.g., wavelength and temperature) from remote nodes. With the optical parameters of the remote node, the local node can calculate the temperature adjustment needed to heat/cool the local transmission laser and tune the local filter to the target wavelengths. In particular, retrieving the optical parameters of the remote node may mitigate the cost and effort involved in debugging point-to-point optical links (e.g., wavelength division multiplexed links) based on transceivers.

In one form, a computer-implemented method enables a local node of an optical network to configure a bi-directional optical link with a remote node. The method comprises obtaining local operating parameters associated with the bi-directional link. The local operating parameters include a nominal local wavelength and a local temperature. The method also comprises obtaining remote operating parameters of the remote node, including a nominal remote wavelength and a remote temperature. The method further comprises determining a target local wavelength based on a comparison of the local operating parameters and the remote operating parameters. The method also comprises tuning a local transmitter to generate light at the target local wavelength and tuning a local filter to transmit light at the target local wavelength and reflect light at a target remote wavelength.

In another form, an apparatus comprises an optical network interface, and a processor. The optical network interface comprises a local transmitter, a local receiver, and a local filter. The optical network interface is configured to form a bi-directional link between the apparatus and a remote node in an optical network. The processor is configured to obtain local operating parameters associated with the bi-directional link, including a nominal local wavelength and a local temperature. The processor is also configured to obtain remote operating parameters of the remote node, including a nominal remote wavelength and a remote temperature. The processor is further configured to determine a target local wavelength based on a comparison of the local operating parameters and the remote operating parameters, and tune the local transmitter to generate light at the target local wavelength. The processor is also configured to tune the local filter to transmit light at the target local wavelength and reflect light at a target remote wavelength.

In a further form, one or more non-transitory computer readable media encoded with software comprising computer executable instructions are provided to cause a processor to obtain local operating parameters associated with a bi-directional link between a local node and a remote node on an optical network. The local operating parameters include a nominal local wavelength and a local temperature. The instructions also cause the processor to obtain remote operating parameters of the remote node, including a nominal remote wavelength and a remote temperature. The instructions further cause the processor to determine a target local wavelength based on a comparison of the local operating parameters and the remote operating parameters, tune a local transmitter to generate light at the target local wavelength. The instructions also cause the processor to tune a local filter to transmit light at the target local wavelength and reflect light at a target remote wavelength.

It is to be appreciated that the above examples are not mutually exclusive and may be combined in various arrangements. It is also to be appreciated that the above description is intended by way of example only. Various modifications and structural changes may be made therein without departing from the scope of the concepts described herein and within the scope and range of equivalents of the claims.

What is claimed is:

1. A method comprising:
   at a local node in an optical network, obtaining local operating parameters associated with a bi-directional link with a remote node, the local operating parameters including a nominal local wavelength and a local temperature;
   obtaining remote operating parameters of the remote node, the remote operating parameters including a nominal remote wavelength and a remote temperature;
   determining a target local wavelength based on a comparison of the local operating parameters and the remote operating parameters;
   tuning a local transmitter to generate light at the target local wavelength; and
   tuning a local filter to transmit light at the target local wavelength and reflect light at a target remote wavelength.

2. The method of claim 1, wherein the target local wavelength and the target remote wavelength are separated by at least 2 nanometers.

3. The method of claim 1, wherein the local filter comprises a Bragg grating formed in silicon.

4. The method of claim 1, wherein tuning the local transmitter and tuning the local filter comprises adjusting the local temperature.

5. The method of claim 1, wherein obtaining the remote operating parameters comprises receiving a configuration identifier from the remote node.

6. The method of claim 5, wherein the configuration identifier is encoded in pulses of light from a remote transmitter in the remote node.

7. The method of claim 6, further comprising looking up the configuration identifier in a local storage to obtain the nominal remote wavelength.

8. An apparatus comprising:
   an optical network interface comprising a local transmitter, a local receiver, and a local filter, the optical network interface forming a bi-directional link between the apparatus and a remote node in an optical network; and
   a processor coupled to the optical network interface, and configured to:
     obtain local operating parameters associated with the bi-directional link with the remote node, the local operating parameters including a nominal local wavelength and a local temperature;
     obtain remote operating parameters of the remote node, the remote operating parameters including a nominal remote wavelength and a remote temperature;
     determine a target local wavelength based on a comparison of the local operating parameters and the remote operating parameters;
     tune the local transmitter to generate light at the target local wavelength; and
     tune the local filter to transmit light at the target local wavelength and reflect light at a target remote wavelength.

9. The apparatus of claim 8, wherein the processor is configured to separate the target local wavelength and the target remote wavelength by at least 2 nanometers.

10. The apparatus of claim 8, wherein the local filter comprises a Bragg grating formed in silicon.

11. The apparatus of claim 8, wherein the processor is configured to tune the local transmitter and tune the local filter by adjusting the local temperature.

12. The apparatus of claim 8, wherein the processor is configured to obtain the remote operating parameters by receiving a configuration identifier from the remote node via the optical network interface.

13. The apparatus of claim 12, wherein the optical network interface is configured to receive the configuration identifier encoded in pulses of light from a remote transmitter in the remote node.

14. The apparatus of claim 13, wherein the processor is further configured to look up the configuration identifier in a local storage to obtain the nominal remote wavelength.

15. One or more non-transitory computer readable storage media encoded with software comprising computer executable instructions and, when the software is executed by a processor, cause the processor to:
   obtain local operating parameters associated with a bi-directional link between a local node and a remote node on an optical network, the local operating parameters including a nominal local wavelength and a local temperature;
obtain remote operating parameters of the remote node, the remote operating parameters including a nominal remote wavelength and a remote temperature;
determine a target local wavelength based on a comparison of the local operating parameters and the remote operating parameters;
tune a local transmitter to generate light at the target local wavelength; and
tune a local filter to transmit light at the target local wavelength and reflect light at a target remote wavelength.

16. The non-transitory computer readable storage media of claim 15, further comprising instructions that cause the processor to separate the target local wavelength and the target remote wavelength by at least 2 nanometers.

17. The non-transitory computer readable storage media of claim 15, further comprising instructions that cause the processor to tune the local transmitter and tune the local filter by adjusting the local temperature.

18. The non-transitory computer readable storage media of claim 15, further comprising instructions that cause the processor to obtain the remote operating parameters by receiving a configuration identifier from the remote node.

19. The non-transitory computer readable storage media of claim 18, further comprising instructions that cause the processor to receive the configuration identifier encoded in pulses of light from a remote transmitter in the remote node.

20. The non-transitory computer readable storage media of claim 19, further comprising instructions that cause the processor to look up the configuration identifier in a local storage to obtain the nominal remote wavelength.

\* \* \* \* \*